(12) United States Patent
Emigh et al.

(10) Patent No.: US 9,990,645 B1
(45) Date of Patent: Jun. 5, 2018

(54) DIGITAL FREQUENCY CARD

(75) Inventors: Aaron T. Emigh, Incline Village, NV (US); Cyriac Roeding, Portola Valley, CA (US); Jeffrey Todd Sellinger, Manhattan Beach, CA (US); Evan Tana, San Francisco, CA (US); Moritz Winter, Palo Alto, CA (US)

(73) Assignee: shopkick, Inc., Redwood City, CA (US)

( * ) Notice: Subject to any disclaimer, the term of this patent is extended or adjusted under 35 U.S.C. 154(b) by 1 day.

(21) Appl. No.: 13/303,137

(22) Filed: Nov. 22, 2011

Related U.S. Application Data

(60) Provisional application No. 61/416,241, filed on Nov. 22, 2010.

(51) Int. Cl.
*G06Q 30/02* (2012.01)

(52) U.S. Cl.
CPC ..... *G06Q 30/0226* (2013.01); *G06Q 30/0207* (2013.01); *G06Q 30/0232* (2013.01); *G06Q 30/0261* (2013.01); *G06Q 30/0267* (2013.01)

(58) Field of Classification Search
None
See application file for complete search history.

(56) References Cited

U.S. PATENT DOCUMENTS

| | | | | |
|---|---|---|---|---|
| 6,607,136 B1 * | 8/2003 | Atsmon | ................. | G06F 21/34 235/487 |
| 6,965,868 B1 * | 11/2005 | Bednarek | ........... | G06Q 30/0201 705/26.1 |
| 2003/0050831 A1 * | 3/2003 | Klayh | .................... | G06Q 20/06 705/14.12 |
| 2005/0251440 A1 * | 11/2005 | Bednarek | ........... | G06Q 30/0201 705/7.32 |
| 2005/0278215 A1 * | 12/2005 | Seele, Jr. | ................ | G06Q 30/02 705/14.19 |
| 2006/0069619 A1 * | 3/2006 | Walker et al. | ................... | 705/14 |
| 2006/0206376 A1 * | 9/2006 | Gibbs | .................... | G06Q 30/02 705/14.13 |
| 2007/0156530 A1 * | 7/2007 | Schmitt | .................. | G06Q 30/02 705/14.17 |
| 2009/0061884 A1 * | 3/2009 | Rajan et al. | .................. | 455/445 |
| 2011/0196729 A1 * | 8/2011 | Postrel | ................. | G06Q 20/105 705/14.25 |

OTHER PUBLICATIONS

American Express Membership Rewards, Wayback Machine Web Captures, Jun.-Aug. 2001.*

* cited by examiner

*Primary Examiner* — David J Stoltenberg
(74) *Attorney, Agent, or Firm* — Van Pelt, Yi & James LLP

(57) ABSTRACT

Techniques for providing a digital frequency card are disclosed. A digital frequency card provides an offer or reward upon completion of a prescribed set of one or more actions. In some embodiments, in response to receiving an indication of an occurrence of an action from a set of one or more prescribed actions associated with a digital frequency card of a user, information associated with the digital frequency card stored with respect to a user account of the user is automatically updated to reflect the occurrence of the action, and the user is automatically provided a current status of the digital frequency card.

42 Claims, 4 Drawing Sheets

DIGITAL FREQUENCY CARD

CROSS REFERENCE TO OTHER APPLICATIONS

This application claims priority to U.S. Provisional Patent Application No. 61/416,241 entitled DIGITAL STAMP CARD filed Nov. 22, 2010 which is incorporated herein by reference for all purposes.

BACKGROUND OF THE INVENTION

Many businesses provide incentive for customer loyalty by offering a reward for completing a prescribed number of purchases which are tracked using physical frequency or stamp cards. However, physical frequency or stamp cards suffer many limitations and improved techniques to reward customer loyalty would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1A:
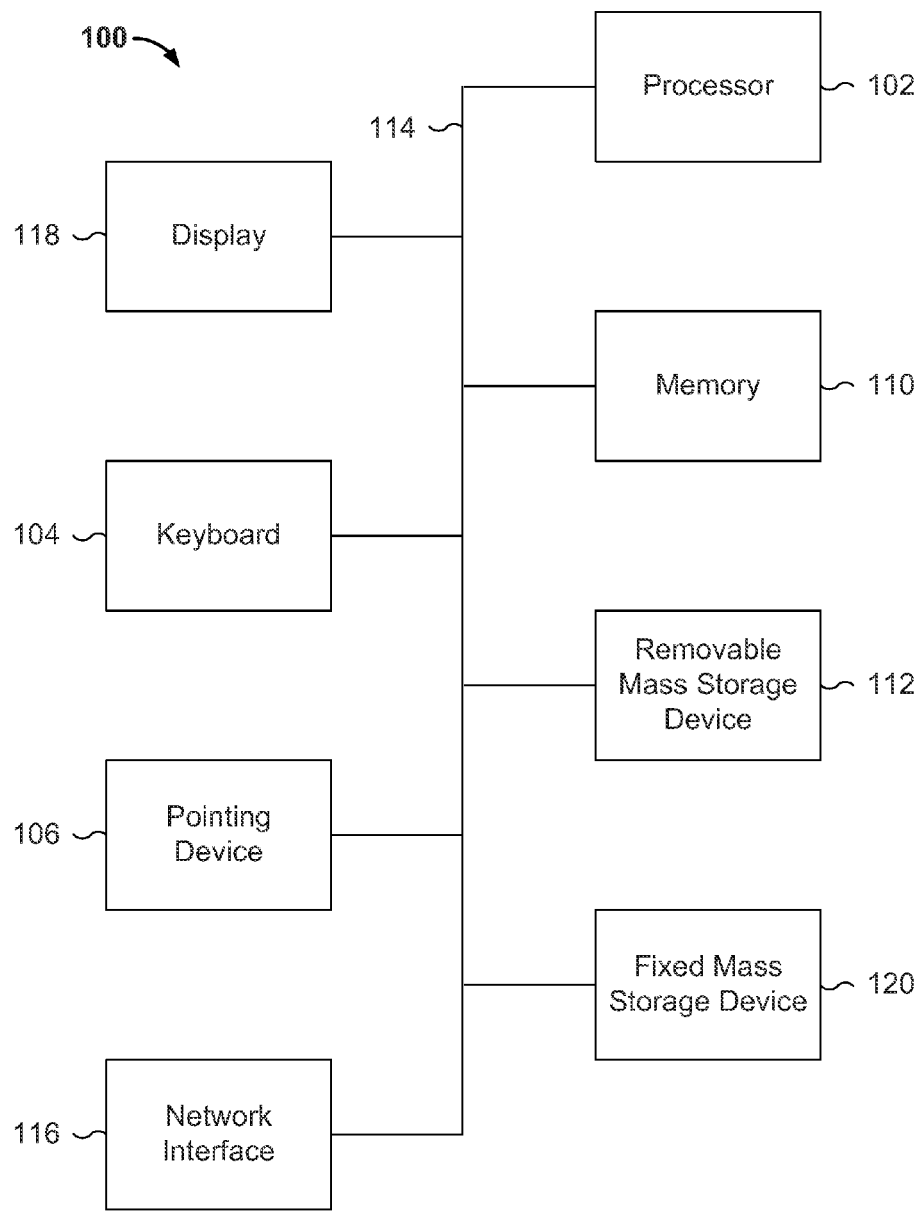
FIG. 1A is a functional diagram illustrating a programmed computer system for providing a digital frequency card in accordance with some embodiments.

FIG. 1A is a functional diagram illustrating a programmed computer system for providing a digital frequency card in accordance with some embodiments. As will be apparent, other computer system architectures and configurations can be used to provide a digital frequency card. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 is used to provide a digital frequency card.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1A is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 1B:
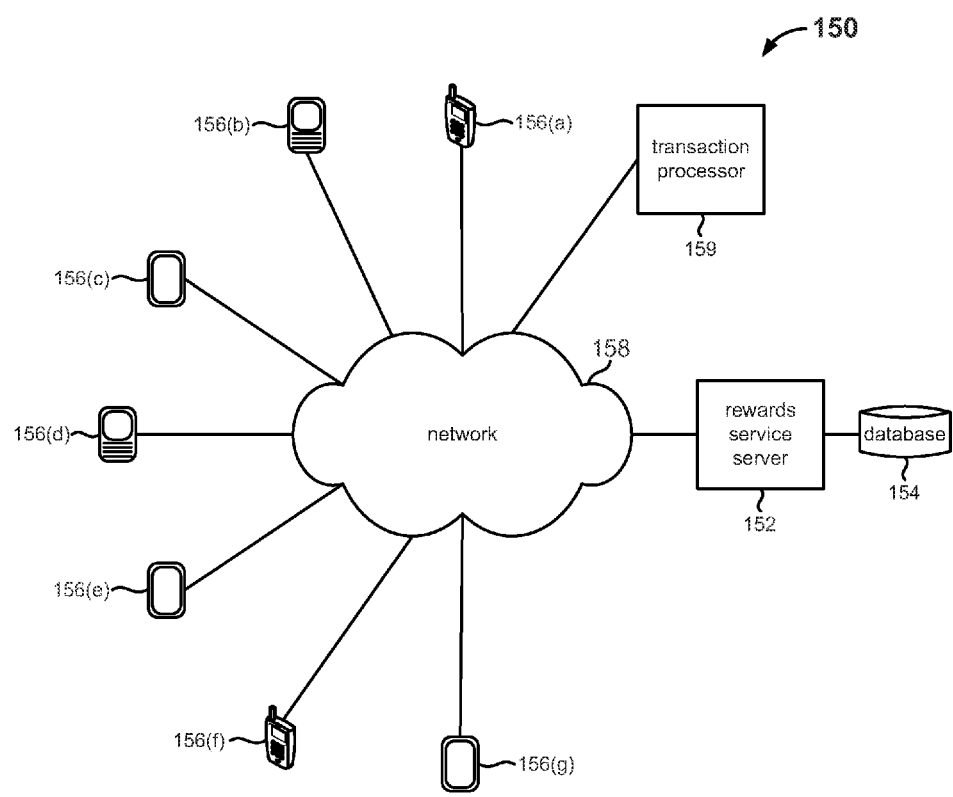
FIG. 1B is a block diagram illustrating an embodiment of a network environment in which a rewards service is provided.

FIG. 1B is a block diagram illustrating an embodiment of a network environment 150 in which a rewards service is provided. The rewards service facilitates the provisioning of offers or rewards on behalf of various entities to users in response to various user actions as further described herein. One example of a reward is a monetary reward, which for example may be applied as a statement credit on a credit card. Another example of a reward is a gift certificate at a retailer. Another example of a reward is unlocking an offer of a discount or promotion which may be otherwise unavailable, which may for example be done by providing a unique coupon code that is not generally available. Another example of a reward is an award of points that may be redeemed for rewards of a user's selection, such as gift certificates, products, and digital merchandise. The rewards service comprises client and/or server components. For example, the rewards service may comprise a mobile application and/or a server application. In one example, the rewards service comprises a mobile application that communicates with a server application. In another example, the rewards service comprises a web application, which in some embodiments may communicate with mobile devices via SMS (Short Message Service) or push notifications.

In the example of FIG. 1B, the rewards service is developed, distributed, and/or managed by the entity comprising server 152. Although depicted as a single block in FIG. 1B, rewards service server 152 may comprise any number of possibly networked components. For example, server 152 may be a part of a server farm. Information associated with the partners (e.g., entities providing the offers or rewards, entities from which data needed for determining offers or rewards is obtained, etc.) and users of the rewards service is stored in one or more databases such as database 154. The rewards service is available to users of each of a plurality of devices 156. For example, a client-side rewards service application may be downloaded from server 152 or another application repository and installed on each of devices 156. In FIG. 1B, devices 156 are depicted as cellular or mobile phones. However, a device 156 may comprise any other computing device that is capable of communicating with server 152, such as a personal or enterprise digital assistant, tablet computer, notebook computer, etc. In various embodiments, such a device may incorporate an application, or may access an application from a server via a web interface. Communication between the client-side rewards service application at each of devices 156 and the server-side rewards service application at server 152 is facilitated via network 158, which in various embodiments may comprise any combination of one or more public, private, wired, and/or wireless networks, such as a cellular network or the Internet. The server and/or client components of the reward service may further be configured to communicate over network 158 with other entities, such as a transaction processor 159, which is further described below.

In some embodiments, the rewards service described with respect to FIG. 1B may partner with a store or service provider to facilitate provisioning of an electronic frequency or stamp card associated with the store or service that provides a user an offer or reward upon user completion of certain actions, which in some cases may have to be completed within prescribed time periods. Electronic or digital frequency cards as disclosed herein allow the ability to automate many features and provide features not available or even feasible with physical stamp cards that are traditionally used by stores or service providers to encourage customers to return. Examples of such features of digital frequency cards include, but are not limited to, the ability to electronically manage data associated with one or more digital frequency cards associated with one or more stores and service providers with respect to a user account, e.g., associated with a mobile or other application; the ability for a user to electronically access information corresponding to one or more digital frequency cards associated with one or more stores and service providers via a unified platform such as a user interface of a single application; the ability for a store or service provider to offer a plurality of types of digital frequency cards having different terms and conditions as well as offers and rewards; the ability to target and/or personalize digital frequency card terms and conditions as well as offers and rewards, e.g., based on available user profiling data; the ability to automatically track a plurality of different types of user actions, a combination of one or more of which may be required for redeeming or receiving an offer or reward; the ability to automatically determine remaining user actions that need to be completed to fulfill the requirements of a digital frequency card, and, if applicable, associated time frames during which such remaining actions need to be performed and providing user notifications of such remaining actions and applicable time frames; etc.

Figure 1C:
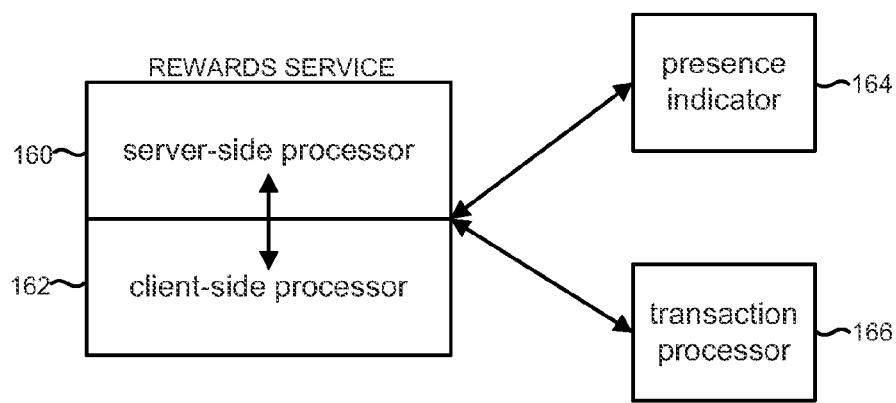
FIG. 1C is a block diagram illustrating an embodiment of processing components that may be employed to provide a digital frequency card.

FIG. 1C is a block diagram illustrating an embodiment of processing components that may be employed to provide a digital frequency card. As depicted, a rewards service includes server-side processor 160 and client-side processor 162. For example, rewards service server 152 of FIG. 1B may include server-side processor 160, and each of devices 156 of FIG. 1B may include a client-side processor 162. Although depicted as single, connected blocks, server-side processor 160 and client-side processor 162 may comprises any number of networked components in various embodiments. The server and/or client-side rewards service components may be configured to communicate with one or more other components such as presence indicator 164 and transaction processor 166 (which, for example, may comprise transaction processor 159 of FIG. 1B). In some embodiments, presence indicator 164 comprises a transmitter (e.g., that is deployed in a store) whose signal the rewards service is configured to detect and decode to determine presence. In other embodiments, presence indicator 164 may comprise a processor of a device (e.g., that is deployed in a store) configured to detect on-site presence, e.g., via handset probe requests. The rewards service may need purchase data to determine the offers and rewards for which a user qualifies based on user purchases. User purchase and/or payment data may be obtained by the server and/or client-side components of the rewards service from transaction processor 166, which may be affiliated with, for example, a loyalty card processing system, a point-of-sale terminal, a retail back-office system, a credit card company, an acquiring bank and/or a transaction processing company handling payment processing on behalf of an acquiring bank, an issuing bank, a third party transaction processing entity, etc. The description below provides further details of the processes, interactions, and/or communications that may occur by or between various components of FIG. 1C.

Any one or more user actions may be required for a digital frequency card offer or reward to be earned or validated. Example user actions include check-ins, store or department visits, and purchases, each of which is further described below. A check-in action indicates user interest and may result from a user browsing to, clicking on, or otherwise selecting or expressing interest in a particular store via a user interface of the client-side rewards service application. In some cases, the user interface may have a dedicated check-in button or other user interface control that a user can select for a check-in action to occur. In some embodiments, a list of nearby stores may be presented to a user based on a current location of the user that has been automatically determined (e.g., via available GPS, cell tower triangulation, or Wi-Fi data) or specified by the user so that the user can check rewards and offers, including digital frequency card rewards and offers, available at nearby places. In some such cases, a check-in action occurs when the user selects a particular store from such a list.

In some embodiments, actual presence is not validated for a check-in action, i.e., there is no confirmation whether a user who checks-in to a store actually visits the store. In such cases, a visit action indicates actual presence in a store or department. Any one or more appropriate techniques may be employed to confirm or detect physical presence. For example, the rewards service application may be configured to detect signals transmitted by (e.g., ultrasonic) transmitters deployed within a store from which store and/or department identifiers can be decoded to confirm presence; the rewards service application may be configured to employ the NFC (near field communication) capability of a handset to detect a code transmitted by an RFID chip deployed at a store from which store and/or department identifiers can be decoded to confirm presence; the rewards service application may be configured to detect signals transmitted by micro-location technologies deployed in a store from which store and/or department identifiers may be decoded to confirm presence; the rewards service application may be configured to detect signals transmitted by nano or femto cell transmitters deployed in a store from which store and/or department identifiers can be decoded to confirm presence; calibrated Wi-Fi micro-location technologies may be employed to determine presence on-site or at a department; a device that is configured to listen for handset probe requests on a Wi-Fi network such as an 802.11 network may be deployed in a store so that MAC addresses of handsets present within the store can be determined and compared to a list of known MAC addresses of users of the rewards service to confirm presence of such users in the store; etc.

An actual purchase by a user of an item or service comprises a purchase action. Any one or more appropriate techniques may be employed to detect purchase actions. For example, purchases of items or services can be tracked and/or counted via store loyalty cards. In some embodiments, rewards offered by the rewards service are linked to store loyalty cards, and purchase data is provided by loyalty card processing systems to the rewards service so that appropriate rewards can be granted to a user for actual purchases. Such data may also be employed to detect purchase actions required to complete digital frequency cards. In some embodiments, purchase actions are detected via an integration at a point-of-sale terminal, wherein the point-of-sale terminal transmits purchase data to the rewards service. In some embodiments, purchase actions are detected via an integration with retailer back-office systems, wherein a retailer back-office system sends transactional data to the rewards service when a transaction is performed by a user who is a member of the rewards service. In some embodiments, purchase actions are detected via an integration with mobile payment functionality. In some embodiments, purchase actions are detected from credit card transactions. In such cases, for example, the rewards service may partner with entities such as credit card companies, acquiring banks or networks aggregating acquiring banks, issuing banks, and/or other third party entities associated with processing credit card transactions to obtain purchase data. Using such entities to obtain purchase data is further described below.

In some embodiments, the rewards service provider partners with credit card companies. In some such cases, for example, credit card information (e.g., a credit card number) may be specified by a user with respect to a user account with the rewards service and communicated by the rewards service to an associated credit card company. In such cases, a list of merchants (i.e., stores or service providers) partnered with the rewards service is also communicated to the credit card company. The credit card company identifies transactions by the credit card number at partnered merchants and reports relevant transaction details back to the rewards service provider so that purchase actions can be identified and applied to appropriate digital frequency cards of the associated user by the rewards service provider. As another example, rather than a user specifying credit card information with respect to a user account with the rewards service and the rewards service communicating the credit card information to an associated credit card company, the credit card information is instead entered by the user into a user handset and encrypted at the handset, for example in a mobile application of the rewards service, or alternately by Javascript associated with a web page of the rewards service, running in a user' browser session, with a public key generated by, or on behalf of, a credit card company and communicated to the rewards service without communicating the corresponding private key, which is kept confidential by the credit card company, so that the actual credit card information is never disclosed to the rewards service provider's server environment. In yet another example, a partnered credit card company may provide a web page or form via which a user can securely specify credit card information that is communicated directly to the credit card company. In such cases, the credit card company reports details of transactions by the user at partnered merchants to the rewards service provider without disclosing credit card information to the rewards service provider.

In some embodiments, the rewards service provider partners with an acquiring bank (i.e., the bank that receives a credit card transaction from a merchant) and/or a transaction processing company handling payment processing on behalf of an acquiring bank. Similar to the case of partnering with a credit card company as described above, credit card information as well as a list of partnered merchants are provided to the acquiring bank and/or transaction processing company, and the acquiring bank and/or transaction processing company identifies transactions by a user credit card number at partnered merchants and reports relevant transaction details to the rewards service provider so that purchase actions can be identified and applied to appropriate digital frequency cards of the user by the rewards service provider. In such cases, all of the transmission possibilities described above in conjunction with a credit card company can also be used with an acquiring bank and/or a transaction processing company handling payment processing on behalf of an acquiring bank.

In some embodiments, the rewards service provider partners with an issuing bank (i.e., the bank that issues a credit card to a user). In some such cases, a user specifies, with respect to an associated user account with the rewards service provider, information (e.g., a username and password) to access the user's account with the issuing bank so that the rewards service provider is able to directly access the user's account and identify transactions at partnered merchants so that applicable purchase actions can be identified and applied to appropriate digital frequency cards of the user. Such input and storage of usernames and passwords may, in various embodiments, be received, stored, and/or used by a rewards service, or by a third party service that provides access to multiple issuing bank accounts via a uniform API accessed by the rewards service.

As described, purchase actions may be identified using data reported from one or more partnered entities that are associated with processing credit card transactions. More specifically, purchase data may be obtained from the authorization stream of the transaction process (i.e., data associated with an initiation of the transaction), the clearance stream of the transaction process (i.e., data associated with a clearance of the transaction), and/or the settlement stream of the transaction process (i.e., data associated with a settlement of the transaction). In some embodiments, it may be desirable to obtain purchase data from the authorization stream since it is the quickest source for obtaining the data. In some cases, offers and rewards may be held in escrow for a prescribed period of time such as a return period of a purchased item or a transaction, the return period of a purchased item or transaction plus extra time sufficient to include latency in reporting of returns data, and/or at least until the settlement stream data is available (e.g., so that the settlement stream data and data obtained earlier in the transaction stream can be reconciled). Holding the offers and rewards in escrow for such time periods allows offers and rewards provided for items that are subsequently returned, or for transactions that include such items, to be rescinded.

In addition to and/or instead of user actions such as a prescribed number of check-ins, visits, and/or purchases as described above, the terms and conditions of a digital frequency card may require one or more other tasks and/or actions to be completed such as visiting a store at certain times or on certain days; visiting a different store chain; visiting different stores of a common owner; visiting a website or mobile site and/or using a mobile application associated with a store or service provider, each of which may be tracked by requiring a user to obtain a code from the site or application that is entered into the rewards service application; etc. Thus, a digital frequency card may require any number and combination of one or more actions to be completed to be validated. A digital frequency card may provide any of a variety of different types of rewards or offers. For example, the offer or reward may comprise a free item or service, a discount or special deal on a future purchase, a gift card, a credit card credit, etc. In some embodiments, the reward of a digital frequency card includes reward points that are redeemable for rewards such as gift cards, travel vouchers, credits for services such as online games and media stores, donations to charities, etc.

In various embodiments, a digital frequency card may be generic and available for any user, targeted to users who match one or more associated targeting parameters, and/or personalized for a prescribed user. Any appropriate targeting and/or personalization parameters may be employed to determine the terms and conditions and/or offers and rewards associated with a digital frequency card. Examples of targeting and/or personalization parameters include or may be based on explicitly indicated or implicitly inferred user preferences, demographic data, behavioral patterns such as browsing or purchase history, stores or types of stores frequented or "favorited", items or services or types of item or services frequently purchased, geographic region and/or current location, etc. In various embodiments, targeting and/or personalization parameters, terms and conditions, and/or rewards and offers associated with a digital frequency card may at least in part be selected and/or specified by the store or service provider with which the digital frequency card is associated, the rewards service provider, and/or another third party.

Different required user actions, time scales for performing the actions, and offers and rewards may be associated with digital frequency cards targeted or personalized for different users of the same store or service provider. For example, Alice may be presented with a digital frequency card for a coffee shop that offers 150 reward points or a free coffee if she visits the store chain twice in one week, Bob may be presented with a digital frequency card for the coffee shop that offers 250 reward points or a free coffee if he visits the store chain 3 times in 2 weeks, Charlie may be presented with a digital frequency card for the coffee shop that offers 10% off an entire purchase if he visits the store chain 4 times in 3 weeks, Doug may be presented with a digital frequency card for the coffee shop that offers 5 reward points for every check-in at a store chain and 500 reward points for 5 purchases within 10 days. As apparent from the aforementioned example, some offers and rewards are available only if certain user actions are performed within a prescribed time frame. In such cases, if a person does not fulfill the necessary requirements within the allotted time, the reward or offer expires. In other embodiments, a digital frequency card may not have an expiration date.

In some embodiments, reward levels may be established for a given user based on that user's habitual usage patterns, for example at or slightly above that user's habitual usage patterns. For example, a predetermined set of frequency cards may be established with respect to a retailer. A user's behavioral patterns may be analyzed to determine that the user visits a restaurant with a particular frequency, e.g., twice a week. A frequency card may be targeted to the user that is the card with the lowest required usage level selected from among the set of cards that exceed the user's habitual usage level. In this way, a frequency card may be used to induce a higher level of usage than the user has habitually engaged in. In another example, a frequency card may be targeted to the user that is the card with the highest required usage level selected from among the set of cards that do not exceed the user's habitual usage level. In this way, a frequency card may be used to reinforce a level of usage that the user has habitually engaged in.

Figures 2A, 2B:
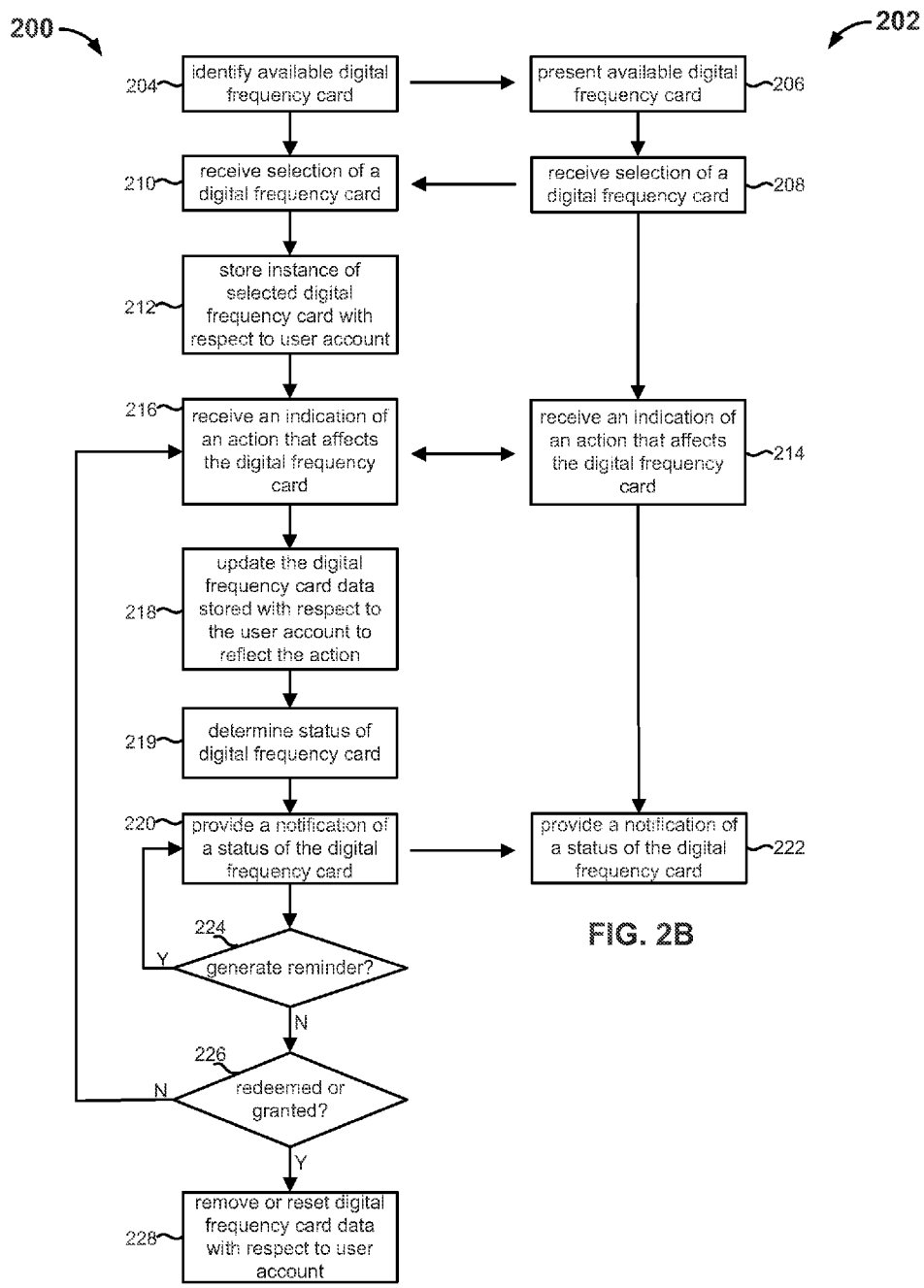
FIGS. 2A-2B are flow charts illustrating embodiments of processes associated with providing a digital frequency card.

FIGS. 2A-2B are flow charts illustrating embodiments of processes associated with providing a digital frequency card. Process 200 of FIG. 2A may be employed, for example, by rewards service server 152 of FIG. 1B or by server-side processor 160 of FIG. 1C; and process 202 of FIG. 2B may be employed, for example, by any of devices 156 of FIG. 1B or by client-side processor 162 of FIG. 1C. That is, process 200 may be employed by a server-side application of the rewards service while process 202 may be employed by a client-side application of the rewards service. Process 200 starts at step 204 at which an available digital frequency card is identified; and process 202 starts at step 206 at which the available digital frequency card is presented to a user, for example, via a user interface display. In some embodiments, an available digital frequency card that a user may be interested in is automatically identified at step 204 and presented at step 206. That is, the rewards service may automatically suggest or recommend a particular digital frequency card to a user based on, for example, the stores and/or services providers as well as types of items and/or services in which the user is generally interested, presently interested, and/or inferred to potentially be interested in based on factors such as explicitly indicated or implicitly determined user preferences, demographic data, behavioral patterns, geographical region or location, etc. For example, the digital frequency card identified at step 204 and presented at step 206 may be associated with a store or service that the user has explicitly indicated an interest in by "favoriting" or "liking"; may be associated with a store or service that the user has implicitly indicated an interest in as inferred from browsing history; may be targeted to the gender, age group, ethnicity, and/or geographical region of the user; may be associated with a store or type of store that the user often frequents; may be associated with an item or service or type of item or service that the user often purchases; may be associated with a store in or near which the user is currently located; etc. In some embodiments, a digital frequency card may be identified automatically by detection of an action that is relevant to that frequency card, i.e., by an indication of an action as described below in conjunction with step 216. In such embodiments, a mapping from action types to frequency cards may be consulted, and an available digital frequency card may be automatically identified by looking up the action type in such a mapping. Alternately, rules may be applied to determine a digital frequency card to identify, as described below. In other embodiments, an available digital frequency card that a user may be interested in is identified at step 204 and presented at step 206 in response to an explicit user action such as a search for available digital frequency cards associated with a particular store or service provider, item or service, type of item or service, location, etc. In some embodiments, a plurality of available digital frequency cards are identified at step 204 and presented at step 206. Such available digital frequency cards may be refined as described above by selecting a card related to a retailer or other entity based on the user's behavior.

At step 208 of process 202 and step 210 of process 200, a selection of a digital frequency card is received. For example, the selected digital frequency card may comprise the digital frequency card identified at step 204 and presented as step 206. The selection of the digital frequency card may be received from a user via a client-side application (e.g., associated with a mobile or other computing device) or via a web application. The selection of steps 208-210 may coincide with a first or current use of the digital frequency card and/or may be made for a future use of the digital frequency card. At step 212, an instance of the digital frequency card is stored with respect to a user account of the user, such as in an associated database record such as of database 154 of FIG. 1B. Although included in process 200 or process 202, one or more of steps 204-212 may be optional. For instance, a user action may automatically be applied to an automatically selected applicable digital frequency card without an explicit user indication or selection of the card.

At step 214 of process 202 and/or step 216 of process 200, an indication of an action that affects the digital frequency card is received. In some embodiments, the action of steps 214 and 216 may comprise a user action that satisfies at least one criteria of the digital frequency card such as a check-in, visit, purchase, or other required action, some examples of which were discussed above. In some embodiments, the action of steps 214 and 216 comprises redemption of and/or granting of an offer or reward associated with the digital frequency card. In various embodiments, the indication may be received at a client application as part of process 202 and transmitted to a server application as part of process 200, or vice-versa. Determination that an action affects a digital frequency card may be performed in a variety of different ways. For example, a mapping from actions to frequency cards may be looked up via the action to determine one or more digital frequency cards that may be affected. In another example, one or more rules may be applied to actions which consult stored data that may include a history of user actions and determine based on the action and the user action history the affected digital frequency card(s) (from among digital frequency cards associated with the account of the user performing the action, and/or from among digital frequency cards not so associated, which may be automatically provisioned, or presented to the user for selection).

At step 218 of process 200, the digital frequency card data stored with respect to the user account is updated to reflect the action of steps 214 and 216. An example of such updating is to store a representation of the action, associated with stored data representing the card, for example in a database such as database 154 of FIG. 1B. At step 219 of process 200, the status of the digital frequency card is determined, taking the user action into account. For example, it may be determined that the action completed the actions required for the digital frequency card, and an award is now available. In another example, it may be determined that usage has kept the digital frequency card from expiring, and an expiration timer may be reset. In another example, it may be determined what additional actions, with what constraints such as time constraints, remain to be performed in order to complete the digital frequency card. At step 220 of process 200 and step 222 of process 202, a notification of a status of the digital frequency card is provided. The status may be presented to a user at step 222, for example, via a user interface of the client-side rewards service application. The status may indicate, for example, user actions already completed, user actions that still need to be completed, the time frame during which any remaining user actions need to be completed, and/or that the offer or reward associated with the digital frequency card is ready to be or has already been redeemed or used. In some embodiments, the notification of step 220 comprises a push notification from the server-side application to the client-side application. In some embodiments, completed digital frequency cards may be stored and/or presented to the user separately from incomplete digital frequency cards, e.g. in a separate user interface screen providing access to redemption of completed digital frequency cards, or historically completed and/or redeemed digital frequency cards.

At step 224 of process 200 it is determined whether to generate a reminder for the status of the digital frequency card. In some embodiments, reminder notifications of the status of a digital frequency card are periodically generated and provided to the user to notify the user of any remaining actions that need to be completed and/or the corresponding time frames for performing the remaining actions, or that a card has been completed and that a reward is available. If it is determined at step 224 to generate a reminder, process 200 continues at step 220 at which a notification of the current status of the digital frequency card is provided. The notification provided at step 220 of process 200 is received at the client-side and provided to the user at step 222 of process 202. In some embodiments, steps 220-224 are periodically performed during the lifetime of a digital frequency card, e.g., until an associated offer or reward has been granted or the card expires. In some embodiments, such periods may be temporally constant; in others, user activity may trigger a reminder. For example, detection of user inactivity for a period of time, or of resumption of user activity after a period of inactivity, may trigger a reminder. If it is determined at step 224 to not generate a reminder, process 200 continues at step 226 at which it is determined whether the digital frequency card offer or reward has been redeemed and/or granted. If it is determined at step 226 that the digital frequency card offer or reward has not yet been redeemed and/or granted, process 200 continues at step 216. If it is determined at step 226 that the digital frequency card offer or reward has been redeemed and/or granted, the digital frequency card data is removed from and/or reset with respect to the user account at step 228. Although not depicted, a notification that the digital frequency card has been removed and/or reset may be generated at step 228 and sent to the client-side application so that it can be provided to the user.

Automatically generating and providing notifications of any outstanding actions that need to be completed to validate an offer or reward as well as corresponding time frames and/or other rules associated with the offer or reward is a useful feature that can be associated with digital frequency cards since a user can be automatically and timely reminded before an offer or reward expires or otherwise becomes invalid. A user may also at any time check the status of any one or more associated digital frequency cards via the client-side user interface of the rewards service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an indication of an occurrence of an action by a user;
in response to receiving the indication of the occurrence of the user action, using a processor to automatically select an applicable digital frequency card from a plurality of available digital frequency cards and store an instance of the selected digital frequency card with respect to a user account of the user, wherein the automatically selected digital frequency card provides an offer or reward upon completion of a plurality of required user actions, including the action, over time and wherein the automatically selected digital frequency card comprises a card with a lowest required usage level from among the plurality of available digital frequency cards that exceeds the user's habitual usage level;
automatically updating information associated with the digital frequency card stored with respect to the user account of the user to reflect the occurrence of the action; and
automatically providing the user a current status of the digital frequency card;
wherein the digital frequency card is provided by a rewards service configured to communicate with a presence indicator and wherein communication with the presence indicator comprises a signal encoding information from which presence is determined.

2. The method of claim 1, wherein the action comprises one or more of: a check-in, a visit, and a purchase.

3. The method of claim 1, wherein the indication is received from an entity associated with processing a credit card transaction.

4. The method of claim 1, wherein the plurality of required user actions and offer or reward associated with the digital frequency card are targeted or personalized for the user.

5. The method of claim 1, wherein the user account is associated with the rewards service.

6. The method of claim 1, further comprising tracking and managing data associated with or affecting a set of one or more digital frequency cards including the digital frequency card associated with the user account.

7. The method of claim 1, wherein the status includes an indication of one or more actions from the plurality of required user actions that remain to be completed.

8. The method of claim 7, wherein the status includes an indication of one or more time frames for completing the one of more actions that remain to be completed.

9. The method of claim 1, further comprising generating a notification to remind the user of actions from the plurality of required user actions that need to be completed.

10. The method of claim 1, further comprising determining that the digital frequency card is completed and providing the associated offer or reward.

11. The method of claim 1, wherein the offer or reward comprises points in a rewards program.

12. A system, comprising:
a processor configured to:
receive an indication of an occurrence of an action by a user;
in response to receiving the indication of the occurrence of the user action, automatically select an applicable digital frequency card from a plurality of available digital frequency cards and store an instance of the selected digital frequency card with respect to a user account of the user, wherein the automatically selected digital frequency card provides an offer or reward upon completion of a plurality of required user actions, including the action, over time and wherein the automatically selected digital frequency card comprises a card with a lowest required usage level from among the plurality of available digital frequency cards that exceeds the user's habitual usage level;
automatically update information associated with the digital frequency card stored with respect to the user account of the user to reflect the occurrence of the action; and
automatically provide the user a current status of the digital frequency card;
wherein the digital frequency card is provided by a rewards service configured to communicate with a presence indicator and wherein communication with the presence indicator comprises a signal encoding information from which presence is determined; and
a memory coupled to the processor and configured to provide the processor with instructions.

13. The system of claim 12, wherein the action comprises one or more of: a check-in, a visit, and a purchase.

14. The system of claim 12, wherein the indication is received from an entity associated with processing a credit card transaction.

15. The system of claim 12, wherein the plurality of required user actions and offer or reward associated with the digital frequency card are targeted or personalized for the user.

16. The system of claim 12, wherein the user account is associated with the rewards service.

17. The system of claim 12, wherein the processor is further configured to track and manage data associated with or affecting a set of one or more digital frequency cards including the digital frequency card associated with the user account.

18. The system of claim 12, wherein the status includes an indication of one or more actions from the plurality of required user actions that remain to be completed.

19. The system of claim 18, wherein the status includes an indication of one or more time frames for completing the one of more actions that remain to be completed.

20. The system of claim 12, wherein the processor is further configured to generate a notification to remind the user of actions from the plurality of required user actions that need to be completed.

21. The system of claim 12, wherein the processor is further configured to determine that the digital frequency card is completed and provide the associated offer or reward.

22. The system of claim 12, wherein the offer or reward comprises points in a rewards program.

23. A computer program product, the computer program product being embodied in a non-transitory computer readable storage medium and comprising computer instructions for:
receiving an indication of an occurrence of an action by a user;
in response to receiving the indication of the occurrence of the user action, automatically selecting an applicable digital frequency card from a plurality of available digital frequency cards and storing an instance of the selected digital frequency card with respect to a user account of the user, wherein the automatically selected digital frequency card provides an offer or reward upon completion of a plurality of required user actions, including the action, over time and wherein the automatically selected digital frequency card comprises a card with a lowest required usage level from among the plurality of available digital frequency cards that exceeds the user's habitual usage level;
automatically updating information associated with the digital frequency card stored with respect to the user account of the user to reflect the occurrence of the action; and
automatically providing the user a current status of the digital frequency card;
wherein the digital frequency card is provided by a rewards service configured to communicate with a presence indicator and wherein communication with the presence indicator comprises a signal encoding information from which presence is determined.

24. The computer program product of claim 23, wherein the action comprises one or more of: a check-in, a visit, and a purchase.

25. The computer program product of claim 23, wherein the indication is received from an entity associated with processing a credit card transaction.

26. The computer program product of claim 23, wherein the plurality of required user actions and offer or reward associated with the digital frequency card are targeted or personalized for the user.

27. The computer program product of claim 23, wherein the user account is associated with the rewards service.

28. The computer program product of claim 23, further comprising computer instructions for tracking and managing data associated with or affecting a set of one or more digital frequency cards including the digital frequency card associated with the user account.

29. The computer program product of claim 23, wherein the status includes an indication of one or more actions from the plurality of required user actions that remain to be completed.

30. The computer program product of claim 29, wherein the status includes an indication of one or more time frames for completing the one of more actions that remain to be completed.

31. The computer program product of claim 23, further comprising computer instructions for generating a notification to remind the user of actions from the plurality of required user actions that need to be completed.

32. The computer program product of claim 23, further comprising computer instructions for determining that the digital frequency card is completed and providing the associated offer or reward.

33. The computer program product of claim 23, wherein the offer or reward comprises points in a rewards program.

34. The method of claim 1, wherein the rewards service comprises client and server components.

35. The method of claim 1, wherein the rewards service comprises a mobile application.

36. The system of claim 12, wherein the rewards service comprises client and server components.

37. The system of claim 12, wherein the rewards service comprises a mobile application.

38. The computer program product of claim 23, wherein the rewards service comprises client and server components.

39. The computer program product of claim 23, wherein the rewards service comprises a mobile application.

40. The computer program product of claim 23, wherein the rewards service communicates with a transaction processor.

41. The method of claim 1, wherein the rewards service communicates with a transaction processor.

42. The system of claim 12, wherein the rewards service communicates with a transaction processor.

* * * * *